(12) United States Patent  
Lhomme et al.

(10) Patent No.: US 7,481,492 B2
(45) Date of Patent: Jan. 27, 2009

(54) CHILD RESTRAINT WITH SWIVELING JUVENILE SEAT AND SWIVEL-DIRECTION CONTROLLER

(75) Inventors: Gilles Lhomme, Chateau d'Olonne (FR); Richard Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 11/849,011

(22) Filed: Aug. 31, 2007

(65) Prior Publication Data

US 2008/0054695 A1    Mar. 6, 2008

Related U.S. Application Data

(63) Continuation-in-part of application No. 11/766,066, filed on Jun. 20, 2007, and a continuation-in-part of application No. 11/766,071, filed on Jun. 20, 2007.

(60) Provisional application No. 60/953,110, filed on Jul. 31, 2007.

(30) Foreign Application Priority Data

Sep. 1, 2006    (FR)    .................................... 06 07696
Sep. 1, 2006    (FR)    .................................... 06 07707

(51) Int. Cl.
*A47D 1/10*    (2006.01)

(52) U.S. Cl. .............................. 297/256.12; 297/256.16

(58) Field of Classification Search ............ 297/256.12, 297/256.16
See application file for complete search history.

(56) References Cited

U.S. PATENT DOCUMENTS

| | | | | |
|---|---|---|---|---|
| 4,936,629 A * | 6/1990 | Young | .................... | 297/256.12 |
| 4,971,392 A * | 11/1990 | Young | .................... | 297/256.12 |
| 5,183,312 A * | 2/1993 | Nania | .................... | 297/256.12 |
| 5,524,964 A * | 6/1996 | Weimersheimer | ...... | 297/256.12 |
| 6,260,920 B1 * | 7/2001 | Tolfsen | ............... | 297/256.12 X |
| 6,679,552 B1 * | 1/2004 | Kassai | ................ | 297/256.12 X |
| 6,773,065 B1 | 8/2004 | Stamper | | |
| 7,073,859 B1 * | 7/2006 | Wilson | ................ | 297/250.1 X |
| 7,357,451 B2 * | 4/2008 | Bendure et al. | ........ | 297/256.12 |
| 2002/0163232 A1 * | 11/2002 | Vezinet et al. | ......... | 297/256.12 |
| 2006/0170262 A1 * | 8/2006 | Gold et al. | ............. | 297/256.12 |

FOREIGN PATENT DOCUMENTS

| | | |
|---|---|---|
| EP | 1110807 | 6/2001 |
| EP | 1247688 | 10/2002 |
| EP | 1625967 | 2/2006 |
| EP | 1625968 | 2/2006 |
| WO | 2005000627 | 1/2005 |

OTHER PUBLICATIONS

International Search Report dated Apr. 5, 2007, French Application No. 0607707.

* cited by examiner

*Primary Examiner*—Rodney B. White
(74) *Attorney, Agent, or Firm*—Barnes & Thornburg LLP

(57) ABSTRACT

A child restraint includes a seat support and a juvenile seat mounted to swivel about an axis on the seat support. The seat support is adapted to set on a vehicle seat.

14 Claims, 11 Drawing Sheets

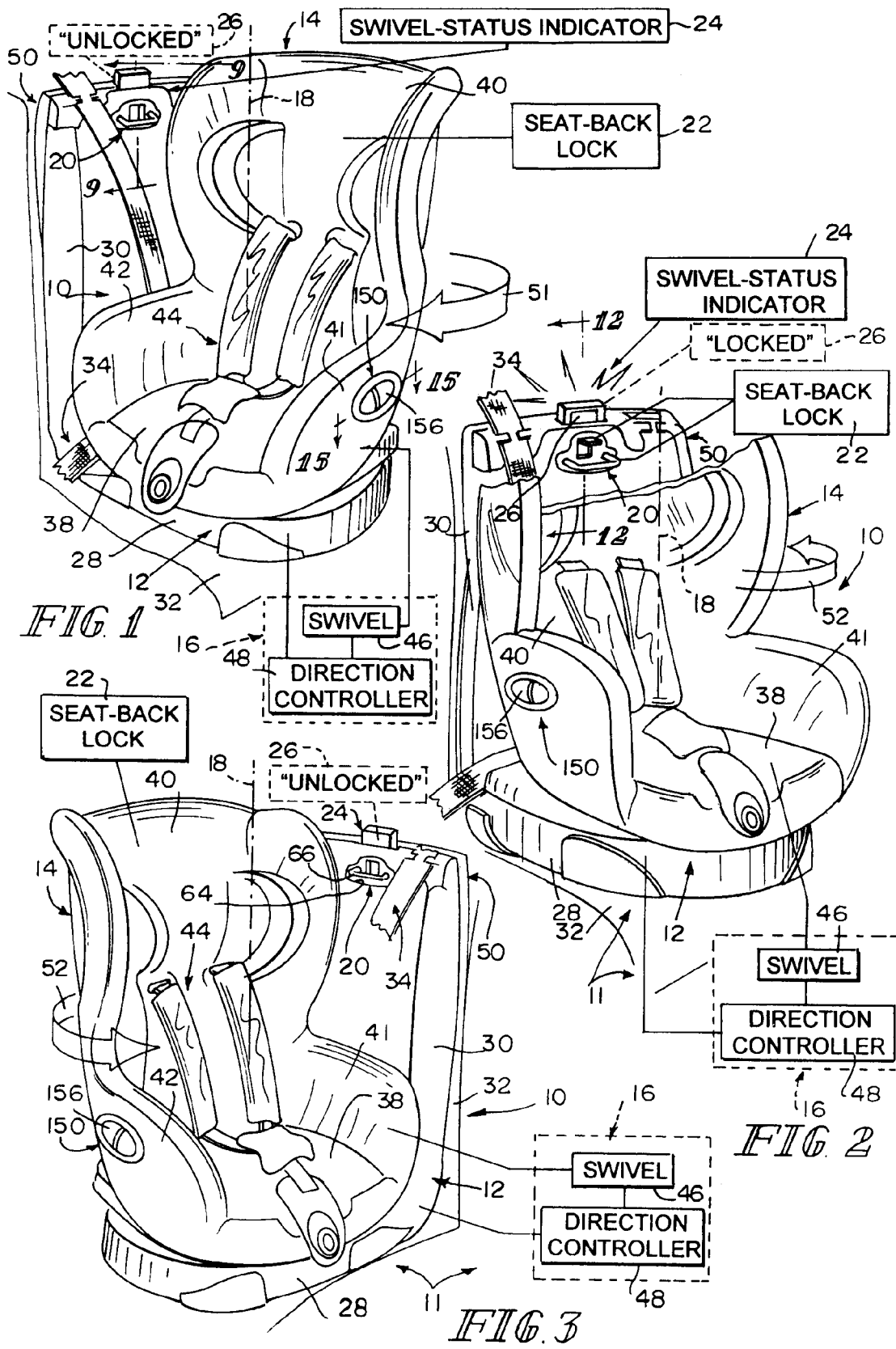

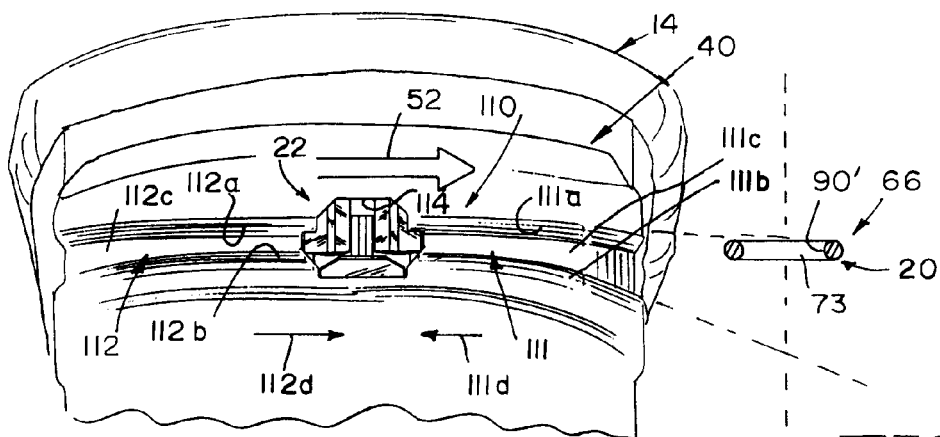
FIG. 5
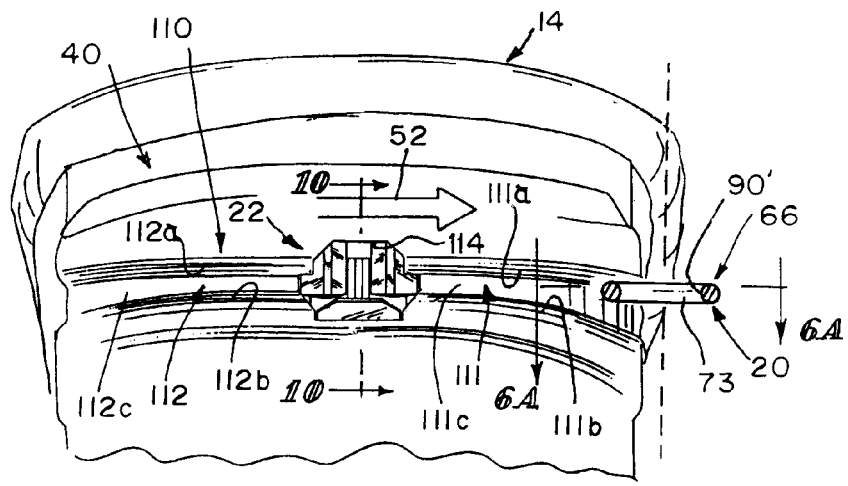
FIG. 6
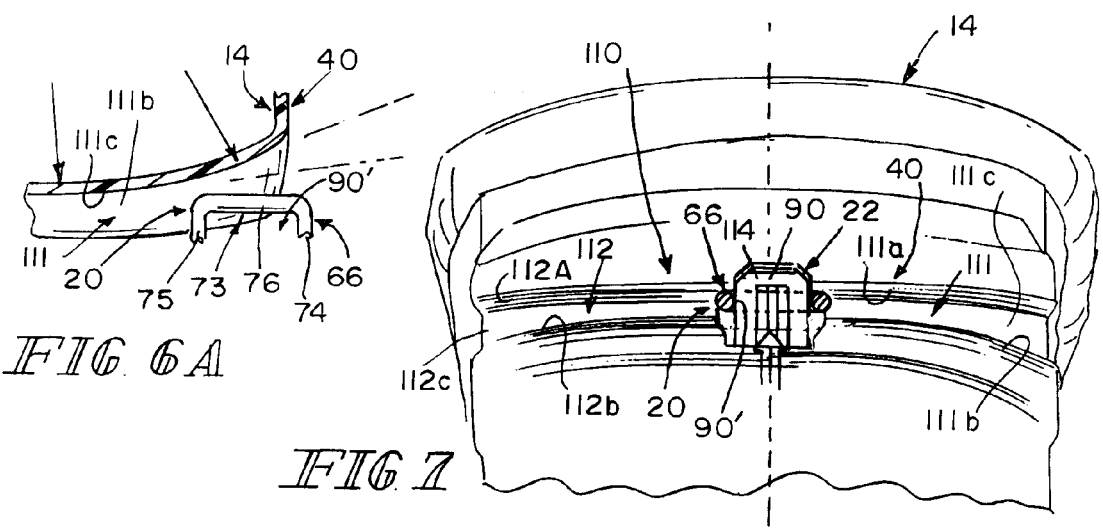
FIG. 6A
FIG. 7

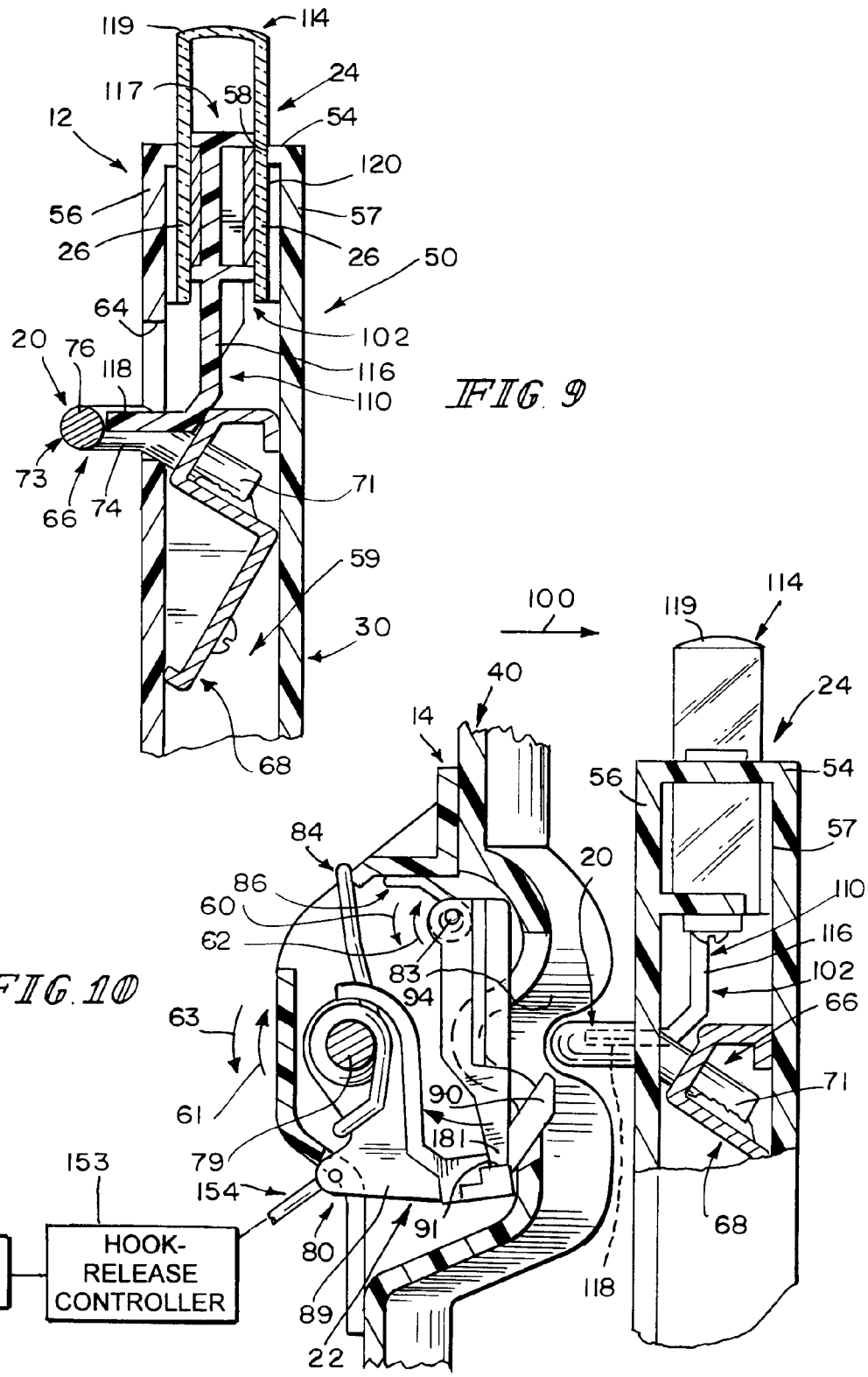

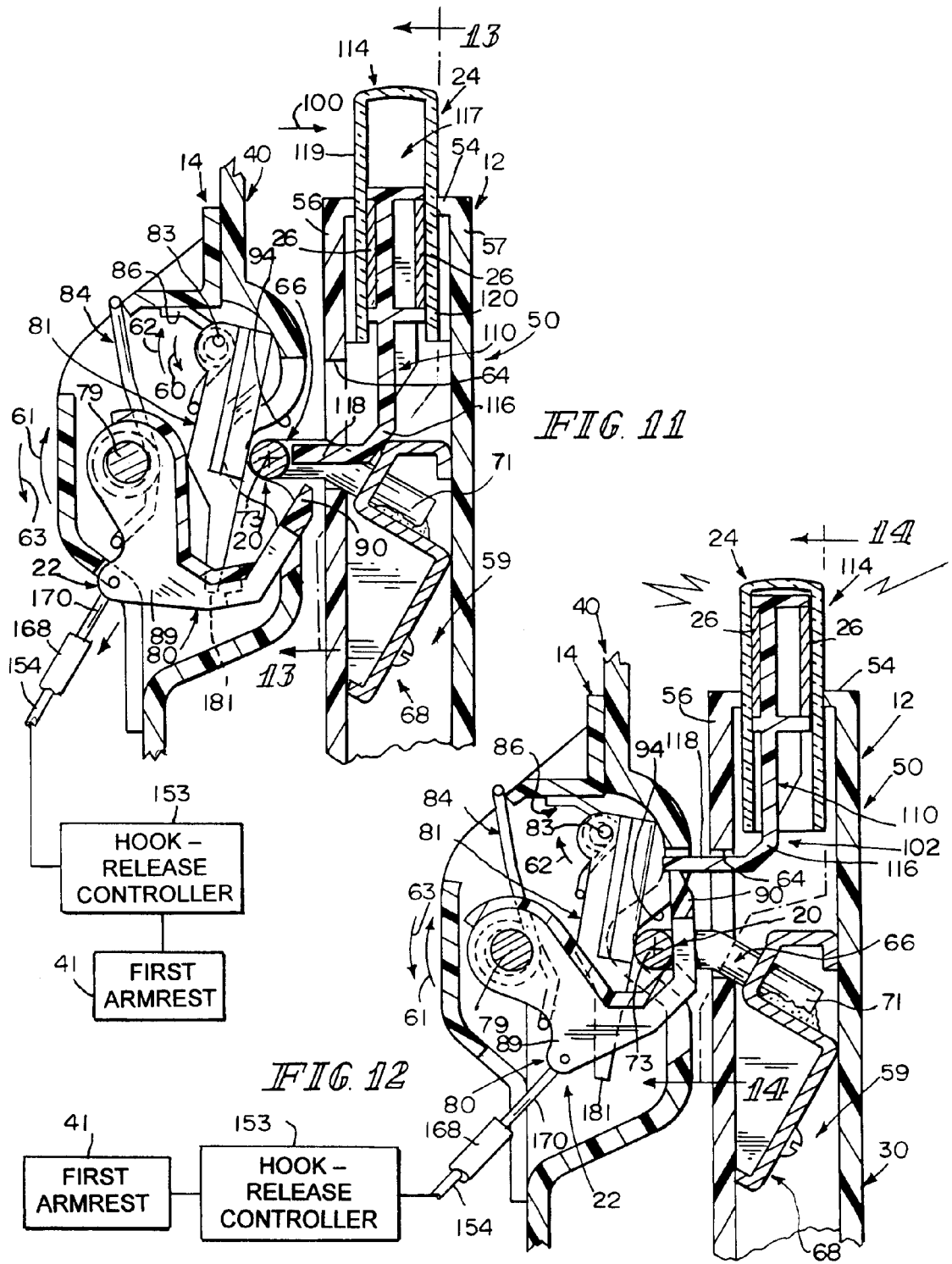

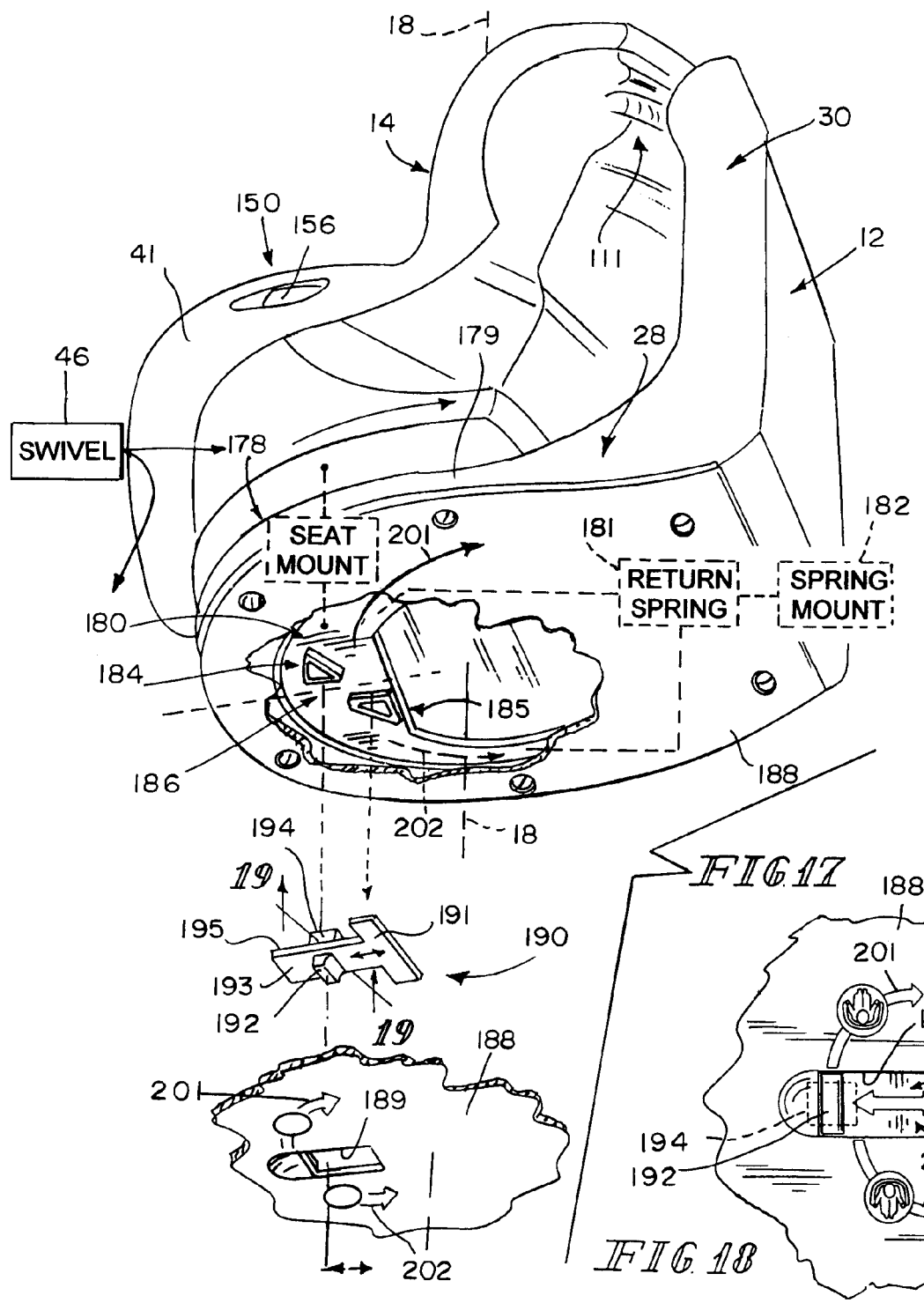

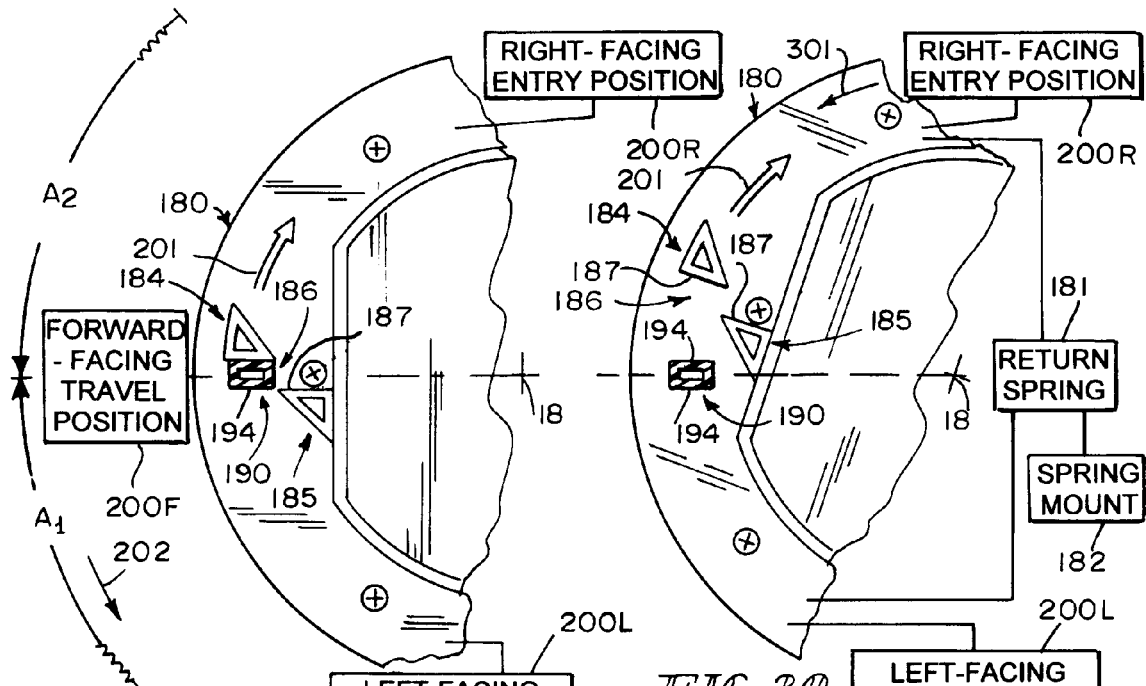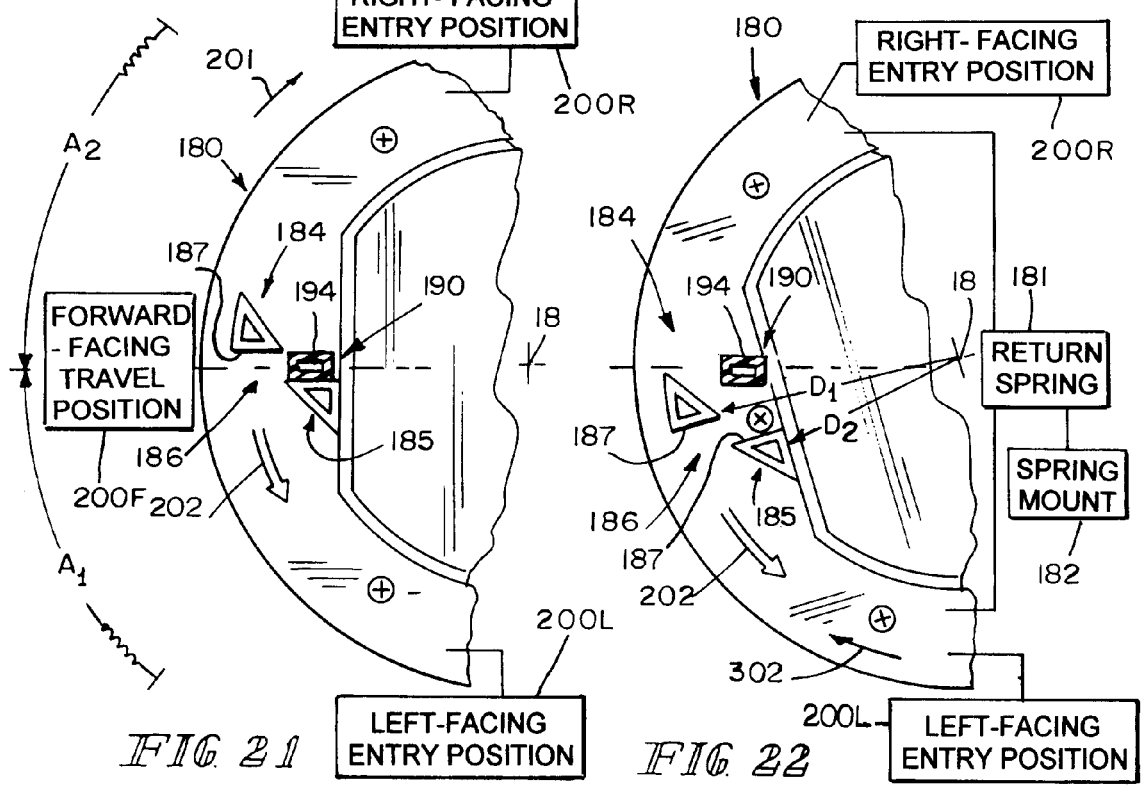

CHILD RESTRAINT WITH SWIVELING JUVENILE SEAT AND SWIVEL-DIRECTION CONTROLLER

This application is a continuation-in-part of and claims priority to U.S. application Ser. No. 11/766,066, filed Jun. 20, 2007 (which claims priority to FR Application No. 06/07696, filed Sep. 1, 2006); is a continuation-in-part of and claims priority to U.S. application Ser. No. 11/766,071, filed Jun. 20, 2007 (which claims priority to FR Application No. 06/07707, filed Sep. 1, 2006); and claims priority to U.S. Provisional Application No. 60/953,110, filed Jul. 31, 2007. This application also claims priority to FR Application No. 06/07696, filed Sep. 1, 2006 and to FR Application No. 06/07707, filed Sep. 1, 2006.

BACKGROUND

The present disclosure relates to child restraints, and particularly to child restraints adapted to be anchored to a vehicle seat to transport a child in a vehicle. More particularly, the present disclosure relates to a child restraint including a swiveling juvenile seat.

SUMMARY

According to the present disclosure, a child restraint includes a seat support and a juvenile seat. The seat support includes a base and a swivel coupled to the base. The juvenile seat is mounted on the swivel for swiveling motion about an axis of rotation between "forward-facing" and "side-facing" positions. The juvenile seat includes a seat bottom mounted on the swivel and a seat back arranged to extend upwardly from the seat bottom.

In illustrative embodiments, the seat support of the child restraint also includes a swivel-direction controller that can be operated to allow a caregiver to limit the "swivel direction" of the juvenile seat to only a clockwise swivel direction or to a counterclockwise swivel direction and to positively establish the forward-facing position of the juvenile seat during swiveling motion of the juvenile seat. By selecting the clockwise swivel direction, the caregiver can swivel the juvenile seat only between a forward-facing "travel" position and a right-facing "entry" position to make it easier to place a child on the juvenile seat when the child restraint is anchored on a vehicle seat near a right rear passenger door in the vehicle. In contrast, by selecting the counterclockwise swivel direction, the caregiver can swivel the juvenile seat only between a forward-facing travel position and a left-facing entry position to make it easier to place a child on the juvenile seat that has been swiveled to assume the left-facing entry position when the child restraint is anchored on a vehicle seat near a left rear passenger door in the vehicle.

In illustrative embodiments, the juvenile seat also includes a seat-back lock and the base includes a swivel-status indicator associated with the seat-back lock. The seat-back lock is carried on the seat back and configured to include a hook designed to mate with a stationary seat anchor coupled to an upstanding anchor-support pad included in the base whenever the juvenile seat is swiveled relative to the base to assume a forward-facing travel position. The swivel-status indicator is coupled to the base and actuated by the hook included in the seat-back lock to notify an observer whenever the juvenile seat is locked to the base in the forward-facing travel position.

A hook-release controller is coupled to each armrest included in the juvenile seat and configured to operate a companion linkage coupled to the hook so that a user can disengage the hook from the stationary seat anchor whenever the operator desires to swivel the juvenile seat relative to the base from the forward-facing travel position to either a left-facing or right-facing entry position so that a child can be seated easily in the juvenile seat while the base of the child restraint is fixed in a stationary position on a vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective and diagrammatic view of an illustrative child restraint including a juvenile seat and a seat support including an "L-shaped" base, a swivel, a swivel-status indicator, and a swivel-direction controller in accordance with the present disclosure and showing that the base of the child restraint is anchored to an underlying vehicle seat by a lap/shoulder belt system included in a vehicle and showing the juvenile seat after it has been rotated on the swivel about 90° in a "clockwise" direction (represented by a double arrow) about a vertical axis relative to an underlying swivel mount included in the base to lie in a "left-facing" entry position relative to the vehicle seat and showing a "swivel-status" indicator and a stationary seat anchor including a U-shaped anchor rail coupled to a top portion of an anchor support that is included in the base;

FIG. 2 is a view similar to FIG. 1 showing the juvenile seat after it has been rotated on the swivel about 90° in a "counterclockwise" direction (represented by a double arrow) about the vertical axis to assume a "forward-facing" travel position relative to the vehicle seat and suggesting that a seat-back lock included in the juvenile seat and coupled to a seat back of the juvenile seat provides means for raising a flag lifter included in the swivel-status indicator to move a signal flag coupled to the flag lifter to a visible position above the base when the seat-back lock mates with the stationary seat anchor to block swiveling motion of the juvenile seat about the vertical axis and relative to the base as the juvenile seat arrives at the forward-facing travel position so that an observer is notified that further swiveling motion of the juvenile seat is blocked;

FIG. 3 is a view similar to FIGS. 1 and 2 showing the juvenile vehicle seat after it has been unlocked and rotated on the swivel about another 90° in the counterclockwise direction (represented by a double arrow) about the vertical axis to assume a "right-facing" entry position relative to the vehicle seat and suggesting that the flag lifter and signal flag included in the swivel-status indicator are lowered to a "not-visible" position in the base in response to separation of the seat-back lock from the stationary seat anchor as a result of swiveling motion of the juvenile seat relative to the base so that an observer is notified that the juvenile seat is in an "unlocked" condition and thus able to rotate freely about the vertical axis;

FIGS. 5-7 are partial rear elevation views of the juvenile seat of FIGS. 1-4 showing (in a diagrammatic manner) "swiveling motion" of the juvenile seat relative to the U-shaped anchor rail included in the stationary seat anchor coupled to the L-shaped base to cause the seat-back lock located in an opening formed in a center portion of the seat back of the juvenile seat to reach and mate with the stationary U-shaped anchor rail to block further swiveling motion of the juvenile seat relative to the base;

FIG. 5 is a rear elevation view of a portion of the top of the seat back included in the juvenile seat of FIG. 4 showing an illustrative seat-back lock exposed in a rear opening formed in the seat back of the juvenile seat and located between a "funnel-shaped" first seat-anchor guide channel formed in the right side of the rear portion of the seat back and a funnel-shaped second seat-anchor guide channel formed in a left side of the rear portion of the seat back and showing the U-shaped anchor rail of the seat anchor located outside of the funnel-shaped first seat-anchor guide channel;

FIG. 6 is a view similar to FIG. 5 showing further "counterclockwise" movement of the seat back relative to the base to locate the U-shaped anchor rail of the stationary seat anchor at a "wide" outer mouth of the funnel-shaped first seat-anchor guide channel;

FIG. 6A is a sectional view taken along line 6A-6A of FIG. 6 showing a "horizontal" lead-in of the U-shaped anchor rail of the stationary seat anchor into the wide outer mouth of the moving funnel-shaped first seat-anchor guide channel;

FIG. 7 is a view similar to FIGS. 5 and 6 showing the result of continued "counterclockwise" movement of the seat back relative to the base to cause the U-shaped anchor rail of the stationary seat anchor on the anchor-support pad of the base to mate with the seat-back lock on the seat back once an upstanding finger included in the seat-back lock extends into a finger-receiving opening formed in the U-shaped anchor rail to lock the juvenile seat in the forward-facing travel position shown in FIG. 2;

FIG. 9 is an enlarged sectional view taken along line 9-9 of FIGS. 1 and 4 showing the stationary seat anchor coupled to the upright anchor-support pad included in the L-shaped base and showing the signal flag of the swivel-status indicator in a hidden (e.g. not-visible) position in a cavity formed in the anchor-support pad;

FIGS. 10-12 are sectional views similar to FIG. 9 showing, in sequence, three positions of the spring-loaded hook included in the seat-back lock;

FIG. 10 is a sectional view similar to FIG. 9 and taken along line 10-10 of FIG. 6 showing the hook retained in an "unlocked" position away from the U-shaped anchor rail of the stationary seat anchor by a downwardly extending spring-loaded hook-retainer latch as the juvenile seat rotates in a "counterclockwise" direction and before the rotating juvenile seat arrives at the forward-facing travel position shown in FIGS. 2, 7, and 10;

FIG. 11 is a sectional view similar to FIG. 10 just as the rotating juvenile seat arrives at the forward-facing travel position to cause the spring-loaded hook-retainer latches (one of which is shown here) to be pivoted in a clockwise direction in response to engagement of the moving hook-retainer latches with the U-shaped anchor rail of the stationary seat anchor so as to disengage the spring-loaded hook, allowing the hook to be pivoted by its spring in a counterclockwise direction toward the U-shaped anchor rail of the stationary seat anchor;

FIG. 12 is a sectional view similar to FIGS. 10 and 11 and taken along line 12-12 of FIG. 2 showing the hook after it has been pivoted by its spring to assume a "locked" position passing an upstanding finger included in the hook through a finger-receiving opening defined by the U-shaped anchor rail and trapping a center bar included in the U-shaped anchor rail of the stationary seat anchor between the finger of the hook and the rear portion of the Juvenile seat to block further swiveling motion of the juvenile seat relative to the base and showing that pivoting movement of the hook caused a top edge of the finger included in the hook to contact the underside of a horizontally extending lift tab included in the flag lifter of the swivel-status indicator and then raise the signal flag carried on the flag lifter upwardly in an internal channel formed in the base to a visible position above the base to notify observers of the child restraint that the seat-back lock has been mated with the stationary seat anchor so that further swiveling motion of the juvenile seat is blocked;

FIG. 17 is an exploded perspective view of the underside of the child restraint showing an illustrative swivel-direction controller located under the juvenile seat in the swivel-mount pad of the L-shaped base;

FIG. 18 is a bottom view of a portion of the underside of the base illustrated in FIG. 17 showing that a direction-selector switch included in the swivel-direction controller has been moved to a first position to allow rotation of the juvenile seat in a first direction from the forward-facing travel position shown in FIG. 2 to the right-facing entry position shown in FIG. 3;

FIGS. 19 and 20 are bottom views of a larger portion of the underside of the base illustrated in FIG. 17 showing that the direction-selector switch has been moved to assume a first position to allow rotation of a swivel included in the child restraint only in a first direction corresponding to counterclockwise rotation of the juvenile seat from the forward-facing travel position of FIG. 2 to the right-facing entry position of FIG. 3;

FIGS. 21 and 22 are bottom views similar to FIGS. 19 and 20 showing that the direction-selector switch has been moved to assume a second position to allow rotation of the swivel only in an opposite second direction corresponding to clockwise rotation of the juvenile seat from the forward-facing travel position of FIG. 2 to the left-facing entry position of FIG. 1.

DETAILED DESCRIPTION

Figure 4:
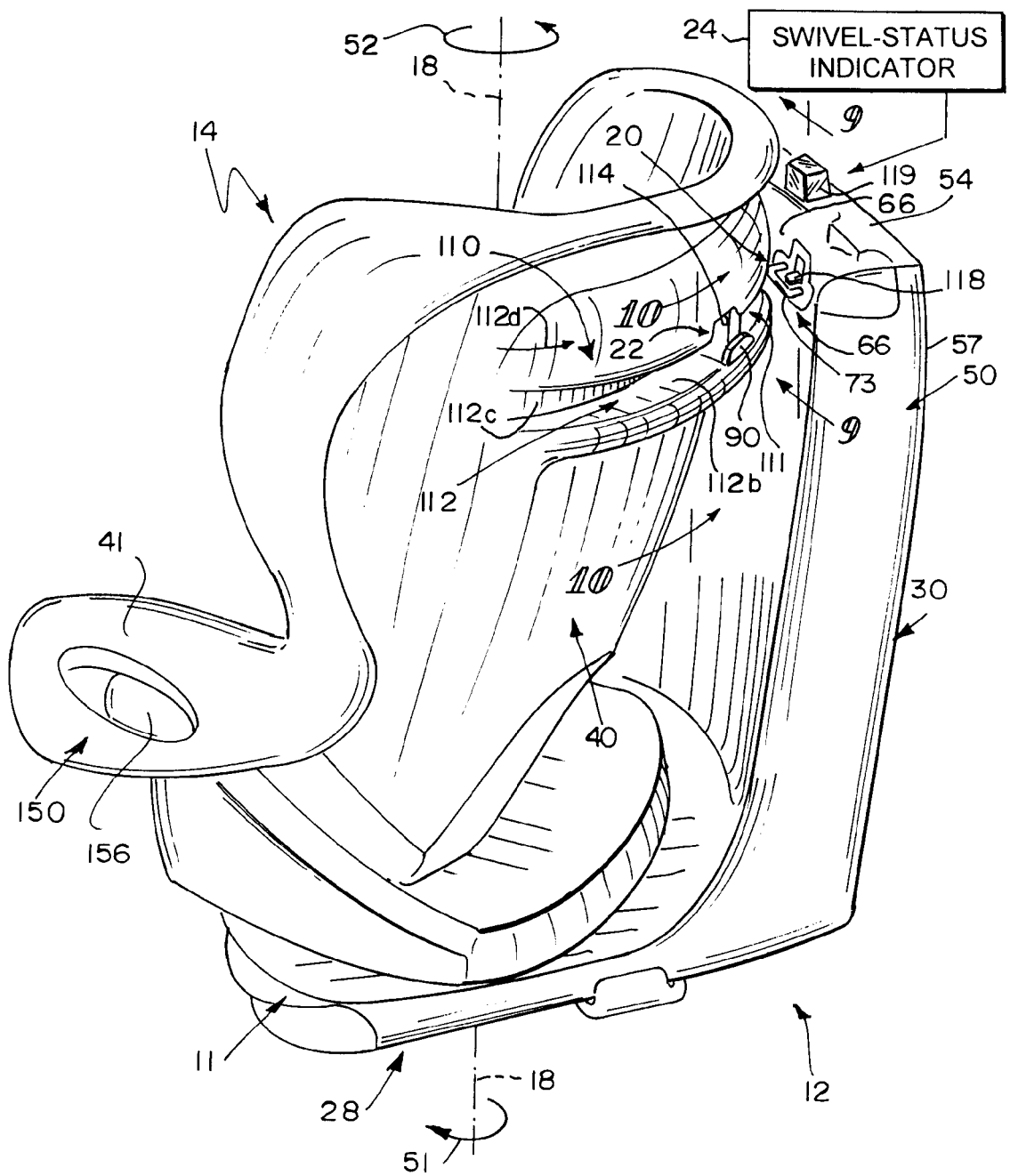
FIG. 4 is an enlarged perspective view of the child restraint as it is being rotated in a counterclockwise direction from the left-facing entry position of FIG. 1 toward the forward-facing travel position of FIG. 2 showing a U-shaped anchor rail included in the stationary seat anchor coupled to the base and showing that the swivel-status indicator includes a flag-viewing shell on top of the base and a horizontally extending lift tab located "behind" the U-shaped anchor rail and mounted for up-and-down movement in a slot formed in the base.

A child restraint 10 in accordance with the present disclosure includes a seat support 11 and a rotatable juvenile seat 14 mounted on seat support 11. Seat support 11 includes a base 12 and a swivel system 16 comprising a swivel 46 and a swivel-direction controller 48. Swivel 16 is coupled to base 12 and juvenile seat 14 and configured to support juvenile seat 14 for swiveling motion about a vertical axis 18 between, for example, a "left-facing" entry position shown in FIG. 1, a "forward-facing" travel position shown in FIG. 2, and a "right-facing" entry position shown in FIG. 3. Swivel-direction controller 48 is coupled to base 12 as suggested in FIGS. 1-3 and 17.

Swivel-direction controller 48 provides means for setting a swivel direction of juvenile seat 14 to allow swiveling motion of juvenile seat 14 about axis 18 in either a clockwise direction or a counterclockwise direction at the option of a caregiver. Swivel-direction controller 48 includes a direction-selector switch 190 that can be moved by a caregiver to a first position relative to base 12 as shown in FIGS. 18-20 to allow swiveling movement of juvenile seat 14 between the forward-facing travel position of FIG. 2 and the right-facing entry position of FIG. 3. Alternatively, direction-selector switch 190 can be moved by a caregiver to a second position relative to base 12 as shown in FIGS. 21 and 22 to allow swiveling movement of juvenile seat 14 between the forward-facing travel position of FIG. 2 and the left-facing entry position of FIG. 1.

Seat support 11 of child restraint 10 also includes a stationary seat anchor 20 coupled to base 12 as suggested in FIGS. 1, 4, and 9. Stationary seat anchor 20 includes an exposed U-shaped anchor rail 73 as shown in FIGS. 1-5. Juvenile seat 14 includes a seat-back lock 22 is configured to mate with U-shaped anchor rail 73 of seat anchor 20 to block swiveling motion of juvenile seat 14 as suggested in FIGS. 5-7 and 10-12. A swivel-status indicator 24 also included in seat support 11 cooperates with seat-back lock 22 as suggested, for example, in FIGS. 10-12, 13, and 14 to raise a signal flag 26 included in swivel-status indicator 24 to a visible position above base 12 as shown in FIGS. 12 and 14 to notify an observer that seat-back lock 22 has mated with stationary seat anchor 20 to block swiveling motion of juvenile seat 14 about vertical axis 18 relative to base 12.

Base 12 is L-shaped in an illustrative embodiment as suggested in FIGS. 1 and 4. Base 12 includes a horizontally extending swivel-mount pad 28 arranged to underlie juvenile seat 14 and an upright anchor-support pad 30 arranged to extend upwardly from a rear edge of swivel-mount pad 28. Seat anchor 20 and swivel-status indicator 24 are coupled to a top portion 50 of upright anchor-support pad 30 as suggested in FIGS. 1-4. Base 12 is adapted to be anchored to a vehicle seat 32 using any suitable means such as a lap-and-shoulder belt restraint harness 34 associated with vehicle seat 32.

Juvenile seat 14 includes a seat bottom 38, a seat back 40 extending upwardly from a rear portion of seat bottom 38, and first and second armrests 41, 42 coupled to seat bottom 38 and seat back 40 as shown, for example, in FIG. 1. Juvenile seat 14 also includes a restraint harness 44 coupled to seat bottom 38 and seat back 40 or any other suitable juvenile restraint means.

Swivel system 16 includes a swivel 46 and a swivel-direction controller 48 as shown diagrammatically in FIGS. 1-3. Swivel 46 is coupled to swivel-mount pad 28 of base 12 and to seat bottom 38 of juvenile seat 14 and is a device joining two parts so that one or both can pivot freely (as on a bolt or pin). Swivel-direction controller 48 is configured to provide means cooperating with swivel 46 for allowing juvenile seat 14 to rotate about vertical axis 18 in only one direction (selected by a caregiver) at a time. Thus, a caregiver can operate swivel-direction controller 48 to allow juvenile seat 14 to rotate about vertical axis 18 from the forward-facing travel position shown in FIG. 2 in either (1) a clockwise direction 51 to assume the left-facing entry position shown in FIG. 1 or (2) a counterclockwise direction 52 to assume the right-facing entry position shown in FIG. 3. An illustrative embodiment of swivel-direction controller 48 is shown in FIGS. 17-22.

Seat anchor 20 is coupled to top portion 50 of upright anchor-support pad 30 of base 12 as shown, for example, in FIGS. 4 and 9. Top portion 50 is formed to include a top wall 54 and front and back walls 56, 57 depending from top wall 54 as shown in FIG. 9. Top wall 54 is formed to include a flag aperture 58 opening into an interior channel 59 formed between front and back walls 56, 57. Front wall 56 is arranged to face toward seat back 40 of juvenile seat 14 when juvenile seat 14 lies in the forward-facing travel position as shown in FIG. 12. Front wall 56 is formed to include an open window 64 associated with seat anchor 20 and swivel-status indicator 24 as shown in FIGS. 3, 4, and 9.

Seat anchor 20 includes an anchor bar 66 and a bar foundation 68 as shown in FIG. 9. Anchor bar 66 is arranged to project from interior channel 59 outwardly through open window 64 formed in front wall 56 so that anchor bar 66 can mate with seat-back lock 22 when juvenile seat 14 is moved to assume the forward-facing travel position as suggested in FIGS. 7 and 12. Bar foundation 68 is mounted in a stationary position, for example, in a region of interior channel 59 near open window 64 as suggested in FIG. 9. In an illustrative embodiment, bar foundation 68 is made of a rigid material such as steel.

As suggested in FIG. 9, anchor bar 66 has a first leg 71 coupled to bar foundation 68, a second leg 72 arranged to lie in spaced-apart relation to first leg 71 and coupled to bar foundation 68, and a U-shaped anchor rail 73 arranged to interconnect "free" ends of first and second legs 71, 72 and lie generally outside of interior channel 59. U-shaped anchor rail 73 includes a short first segment 74 coupled to first leg 71, a short second segment 75 coupled to second leg 72, and a relatively longer third segment 76 arranged to interconnect "free" ends of first and second segments 74, 75 as suggested in FIGS. 6A and 9. Seat-back lock 22 is configured to mate with third segment 76 of U-shaped anchor rail 73 of anchor bar 66 as suggested in FIG. 12 to retain juvenile seat 14 in the forward-facing travel position relative to base 12.

Seat-back lock 22 is shown, for example, in FIGS. 8 and 10-12. Seat-back lock 22 includes a movable hook 80 mounted for pivotable movement about a horizontal axis 179 on a pivot shaft 79 coupled to seat back 40, a first hook-retainer latch 81 mounted for pivotable movement about another horizontal axis 183 on a pivot shaft 83 coupled to seat back 40, and a second hook-retainer latch 82 mounted for pivotable movement about horizontal axis 183 on pivot shaft 83' (or a pivot shaft 83) independent of pivotable first hook-retainer latch 82. Seat-back lock 22 also includes a hook-return spring 84 coupled to hook 80 and seat back 40, a first latch-return spring 86 coupled to first hook-retainer latch 81 and seat back 40, and a second latch-return spring 88 coupled to second hook-retainer latch 82 and seat back 40 as suggested in FIGS. 5 and 10. In the illustrated embodiment, each of springs 84, 86, and 88 is a torsion spring.

Figure 8:
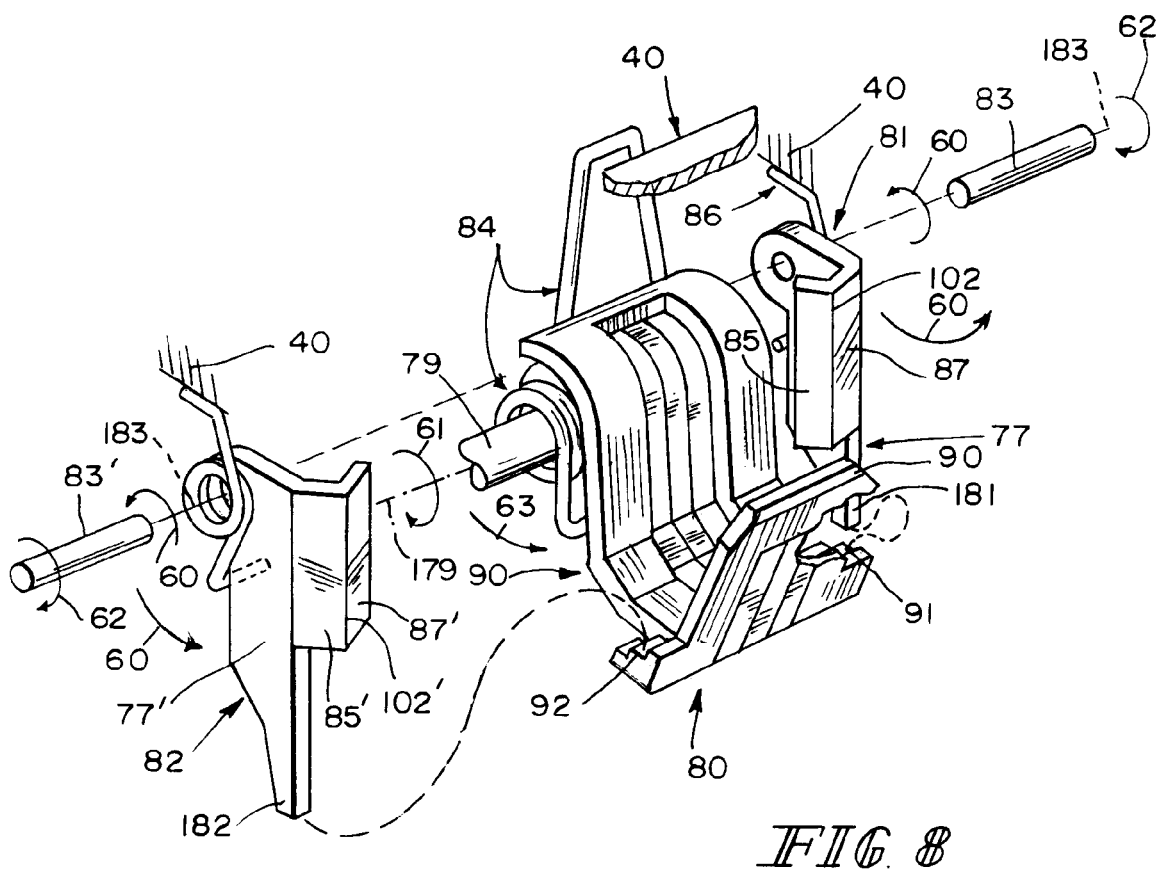
FIG. 8 is an enlarged exploded perspective view of components included in an illustrative seat-back lock along with diagrammatic representations of portions of the adjacent seat back showing that the seat-back lock includes a spring-loaded "wide" hook located between two relatively "narrow" spaced-apart spring-loaded hook-retainer latches and configured to include an upstanding finger sized to extend into a finger-receiving opening formed in the U-shaped anchor rail and showing that downwardly projecting tips of the two hook-retainer latches are configured to engage companion flange plates included in the hook on opposite sides of the finger to retain the hook normally in an "unlocked" position as shown, for example, in FIG. 10.

Hook 80 includes an axle mount 89 coupled to pivot shaft 79, an upstanding finger 90 cantilevered to axle mount 89, a first flange plate 91 coupled to one side of axle mount 89, and a second flange plate 92 coupled to another side of axle mount 89 as shown, for example, in FIG. 8. Finger 90 is arranged to lie between first and second flange plates 91, 92 as shown, for example, in FIG. 8.

Hook 80 is mounted for movement on pivot shaft 79 relative to seat back 14 between an "unlocked" position shown, for example, in FIG. 10 and a "locked" position shown, for example, in FIG. 12. In the unlocked position, hook 80 is disengaged from U-shaped anchor rail 73 of anchor bar 66 of stationary seat anchor 20 as suggested in FIG. 10 to allow swiveling motion of juvenile seat 14 about vertical axis 18 relative to base 12. In the locked position, hook 80 cooperates with seat back 40 of juvenile seat 14 to retain the relatively longer third segment 76 of U-shaped anchor rail 73 of anchor bar 66 of stationary seat anchor 20 as suggested in FIG. 10 in a rearwardly opening groove 94 formed in seat back 40 and arranged to face toward stationary seat anchor 20 when juvenile seat 14 is moved to assume the forward-facing travel position as shown, for example, in FIG. 12. In the illustrated embodiment, in the locked position, upstanding finger 90 of hook 80 extends upwardly into a finger-receiving opening 90' defined by U-shaped anchor rail 73 and provided between U-shaped anchor rail 73 and front wall 56 of upper portion 50 of anchor support 30 of L-shaped base 12 as suggested in FIGS. 7 and 12.

As also shown in FIG. 8, first hook-retainer latch 81 includes an axle mount 77 coupled to pivot shaft 83 and configured to terminate at a downwardly extending tip 181 and a pivot actuator 75 coupled to axle mount 77. Pivot actuator 75 is "roof-shaped" in an illustrative embodiment and includes a left-side cam surface 85 and a right-side cam surface 87 arranged to interconnect left-side cam surface 85 and axle mount 77. Left-side and right-side cam surfaces 85, 87 intersect at a raised ridge 102. When viewed from above in FIG. 8, left-side cam surface 85 has a "negative" slope and right-side cam surface 87 has a "positive" slope. Similarly, second hook-retainer latch 82 includes an axle mount 77' coupled to pivot shaft 83' and configured to terminate at downwardly extending tip 182 and a pivot actuator 75' coupled to axle mount 77'. Pivot actuator 75' includes left-side and right-side cam surfaces 85' and 87' and raised ridge 102'. When viewed from above (in FIG. 8), left-side cam surface 85' has a negative slope and right-side cam surface 87' has a positive slope.

Seat back 40 of juvenile seat 14 is formed to include guide means 10 for guiding U-shaped anchor rail 73 of stationary seat anchor 20 to engage seat-back lock 22 mounted in seat back 40 during rotating movement of juvenile seat 14 about vertical axis 18 relative to base from either the left- or right-facing entry positions of FIGS. 1 and 3, respectively, to the forward-facing travel position of FIG. 2. In an illustrative embodiment, guide means 110 includes a first seat-anchor guide channel 111 formed in the right side of the rear portion of seat back 40 to communicate with a central opening 114 formed in seat back 40 to expose seat-back lock 22 as shown in FIGS. 4-7. Guide means 110 also includes a second seat-anchor guide channel 112 formed in the left side of the rear portion of seat back 40 also to communicate with central opening 114 as shown in FIGS. 4-7.

As suggested in FIGS. 5-7, seat-back lock 22 is exposed in central opening 114 that is formed in seat back 40 and arranged to lie between seat-anchor guide channels 111 and 112. In an illustrative embodiment, first seat-anchor guide channel 111 is funnel-shaped and defined by upper and lower guide walls 111a and 111b converging in a direction 111d extending toward central opening 114 and a rear wall 111c interconnecting guide walls 111a and 111b. First seat anchor guide channel 111 provides means for guiding U-shaped anchor rail 73 of stationary seat anchor 20 to mate with finger 90 of hook 80 as juvenile seat 14 rotates in counterclockwise direction 52 relative to base 12 as suggested in FIGS. 5-7 and 10-12. Similarly, second seat-anchor guide channel 112 is funnel-shaped and defined by upper and lower guide walls 112a and 112b converging in a direction 112d extending toward central opening 114 and a rear wall 112c interconnecting guide walls 112a and 112b. Second seat-anchor guide channel 112 provides means for guiding U-shaped anchor rail 73 of stationary seat anchor 20 to mate with finger 90 of hook 80 as juvenile seat 14 rotates in clockwise direction 51 relative to base 12.

An illustrative process for mating seat-back lock 22 to stationary seat anchor 20 is shown in a sequence illustrated in FIGS. 5-7 and 10-12. Seat-back lock 22 mates with stationary seat anchor 20 normally whenever juvenile seat 14 is rotated about vertical axis 18 either (1) from the left-facing entry position shown in FIG. 1 in counterclockwise direction 52 to arrive at the forward-facing travel position shown in FIG. 2 or (2) from the right-facing entry position shown in FIG. 3 in clockwise direction 51 to arrive at the forward-facing travel position shown in FIG. 2. If, owing to an unexpected event, such mating does not take place in response to rotation of juvenile seat 14, seat-back lock 22 will mate with stationary seat anchor 20 in response to movement of seat back 40 in a generally rearward direction 100 (see FIGS. 10 and 11) toward upper portion 50 of anchor-support pad 30 of L-shaped base 12 owing to elasticity of juvenile seat 14 and/or to external force loads applied in direction 100 to juvenile seat 14.

Hook 80 is shown in an "unlocked" position in FIGS. 6 and 10. First latch-return spring 86 provides means for yieldably urging first hook-retainer latch 81 to rotate in a counterclockwise direction 60 to cause a tip 181 of first hook-retainer latch 81 to engage first flange plate 91 of hook 80 to urge hook 80 to rotate in a clockwise direction 61 (against a torsional biasing force applied by hook-return spring 84) to assume the unlocked position shown in FIG. 10. Similarly, second latch-return spring 88 provides means for yieldably urging second hook-retainer latch 82 to rotate in counterclockwise direction 60 (see FIG. 8) to cause a tip 182 of second hook-retainer latch 92 to engage second flange plate 92 of hook 80 to urge hook 80 to rotate in a clockwise direction 61 (against the torsional biasing force applied by hook-return spring 84). Hook 80 will stay in the unlocked position as long as one or both of spring-loaded first and second hook-retainer latches 81, 82 engage the first and second flange plates 91 to hold hook 80 in the unlocked position as suggested in FIG. 10.

U-shaped anchor rail 73 of anchor bar 66 is arranged to engage both of spring-loaded first and second hook-retainer latches 81, 82 (one after the other) as juvenile seat 14 rotates about vertical axis (either in clockwise direction 51 or counterclockwise direction 52 and arrives at the forward-facing travel position. When juvenile seat 14 rotates in clockwise direction 51, U-shaped anchor rail 73 will engage, in sequence, left-side cam surface 85' on second hook-retainer latch 82 and then left-side cam surface 85 on first hook-retainer latch 81. When juvenile seat 14 rotates in counterclockwise direction 52, U-shaped anchor rail 73 will engage, in sequence, right-side cam surface 87 on first hook-retainer latch 81 and then right-side cam surface 87' on second hook-retainer latch 82.

Engagement of U-shaped anchor rail 73 and hook-retainer latches 81, 82 causes both hook-retainer latches 81, 82 to (1) rotate in counterclockwise direction 62 against the torsional biasing force applied by companion latch-return springs 86, 88 and (2) disengage flange plates 91, 92 of hook 80 as suggested in FIG. 11. This "plate-disengagement" action releases hook 80 to allow hook-return spring 84 to urge hook 80 to rotate in counterclockwise direction 63 to assume the locked position shown in FIG. 12. In the locked position, upstanding finger 90 of hook 80 passes through finger-receiving opening 90' as suggested in FIG. 7 and traps relatively longer segment 76 of U-shaped anchor rail 73 of anchor bar 66 in rearwardly opening groove 94 formed in seat back 40 of juvenile seat 14 as suggested in FIG. 12 to establish mating engagement of seat-back lock 22 and seat anchor 20 to block further swiveling motion of juvenile seat 14 about vertical axis 18 relative to L-shaped base 12.

Figure 13:
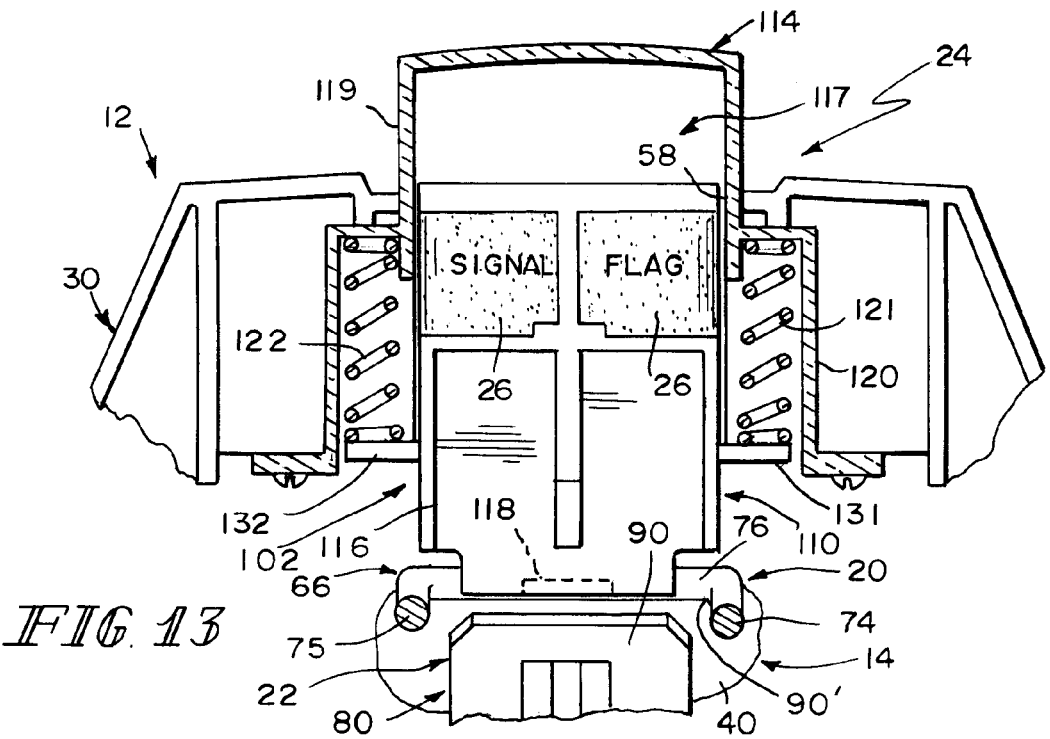
FIG. 13 is a sectional view taken along line 13-13 of FIG. 11 showing the signal flag of the swivel-status indicator in a hidden (e.g. not-visible) position in the base.
Figure 14:
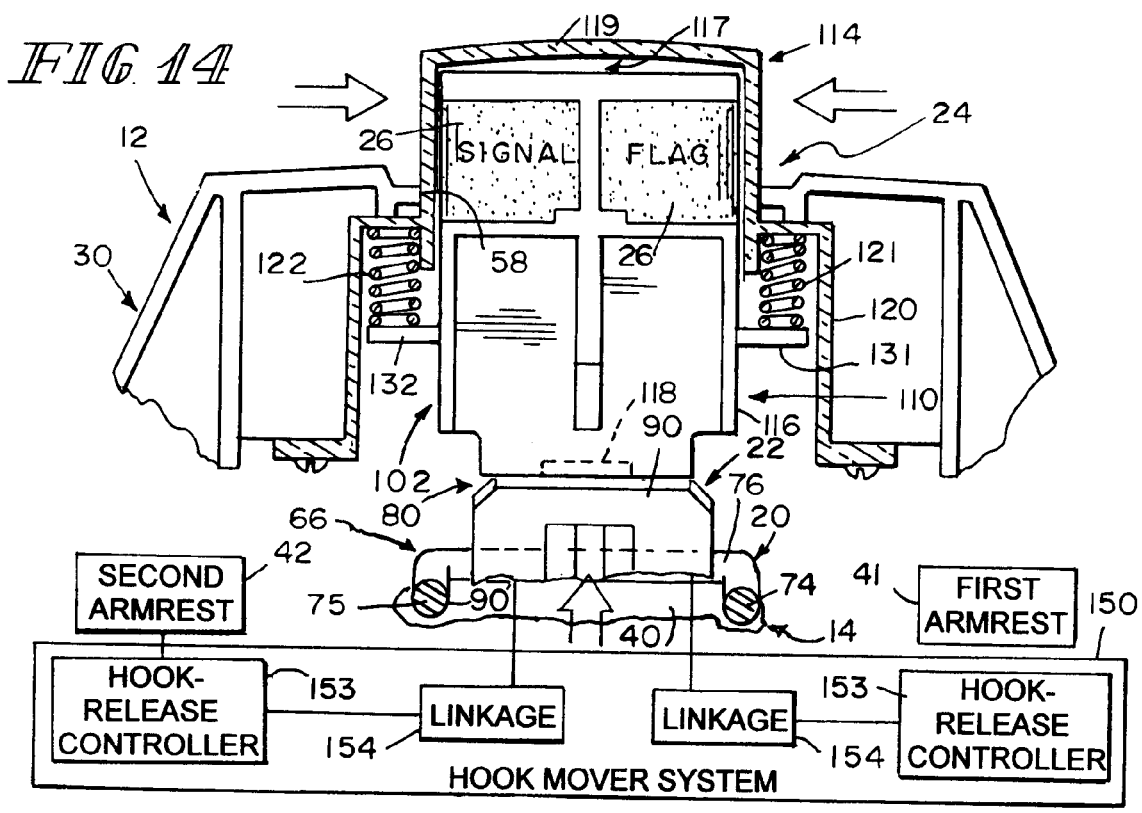
FIG. 14 is a sectional view similar to FIG. 13 and taken along line 14-14 of FIG. 12 showing the signal flag of the swivel-status indicator in the visible position above the base and inside a transparent dome of a flag-viewing shell coupled to the base.

Swivel-status indicator 24 includes a signal unit 102 comprising a signal flag 26 and a flag lifter 110 coupled to signal flag 26, first and second lifter-return springs 111, 112, and a flag-viewing shell 114 as shown, for example, in FIGS. 9, 13, and 14. Signal unit 102 is mounted for movement relative to base 12 between a first position representing an "unlocked" (swiveling) condition of juvenile seat 14 as shown, for example, in FIGS. 9 and 13 and a second position representing a "locked" (non-swivel) condition of juvenile seat 14 as shown, for example, in FIGS. 12 and 14.

Flag lifter 110 includes a vertically extending flag support 116 and a horizontally extending lift tab 118 coupled to a lower end of flag support 116 as shown best in FIG. 9. Flag support 16 is mounted for back-and-forth (e.g. up-and-down) movement in internal channel 59 of top portion 50 of anchor-support pad 30 of base 12. Lift tab 118 is coupled to flag-support 116 for up-and-down movement in open window 64 of front wall 56 of top portion 50 in response to up-and-down movement of flag support 116 in internal channel 59. In an illustrative embodiment, one signal flag 26 is carried on a front face of flag support 116 and another signal flag 26 is carried on a back face of flag support 116.

Flag-viewing shell 114 is made of a transparent material and includes a frame 120 mounted in a stationary position in internal channel 59 of top portion 50 and a dome 119 coupled to frame 120 and arranged to extend through flag aperture 58 formed in top wall 54 of top portion 50. Dome 119 of flag-viewing shell 114 rises above top portion 50 of base 12 as shown, for example, in FIGS. 9, 13, and 14.

First and second lifter-return springs 121, 122 act between, for example, a portion of shell 114 and flanges 131, 132 coupled to flag support 116 and included in flag lifter 110 as shown in FIGS. 13 and 14. Each lifter-return spring 121, 122 is a coiled compression spring in an illustrative embodiment. Normally, lifter-return springs 121, 122 cooperate to define means for yieldably urging flag lifter 110 downwardly to assume a lowered position in internal channel 59 as shown in FIGS. 9 and 13. In this lowered position, signal flags 26 are located in a hidden (e.g. "not-visible") position inside base 12.

Finger 90 of hook 80 moves to engage the underside of lift tab 118 of flag lifter 110 and move flag lifter 110 upwardly to a raised position in internal channel 59 as shown in FIGS. 8 and 10 whenever juvenile seat 14 is rotated about vertical axis 18 to assume the forward-facing travel position. Upward movement of flag lifter 110 raises signal flags 127 to a "visible" position above base 12 and inside dome 119 of flag-viewing shell 114 as shown in FIGS. 12 and 14.

A hook mover system 150 is provided as suggested in FIGS. 10-12, 13, and 14 for affirmatively withdrawing finger 90 of hook 80 from finger-receiving opening 90' in U-shaped anchor rail 73 (at the option of a caregiver) and returning hook 80 to the unlocked position shown in FIG. 10. In an illustrative embodiment, hook mover system 150 includes a hook-release controller 153 coupled to each armrest 41, 42 and a separate linkage 154 coupling each hook-release controller 153 to hook 80 as suggested diagrammatically in FIG. 14 and in FIGS. 10-12.

Figure 15:
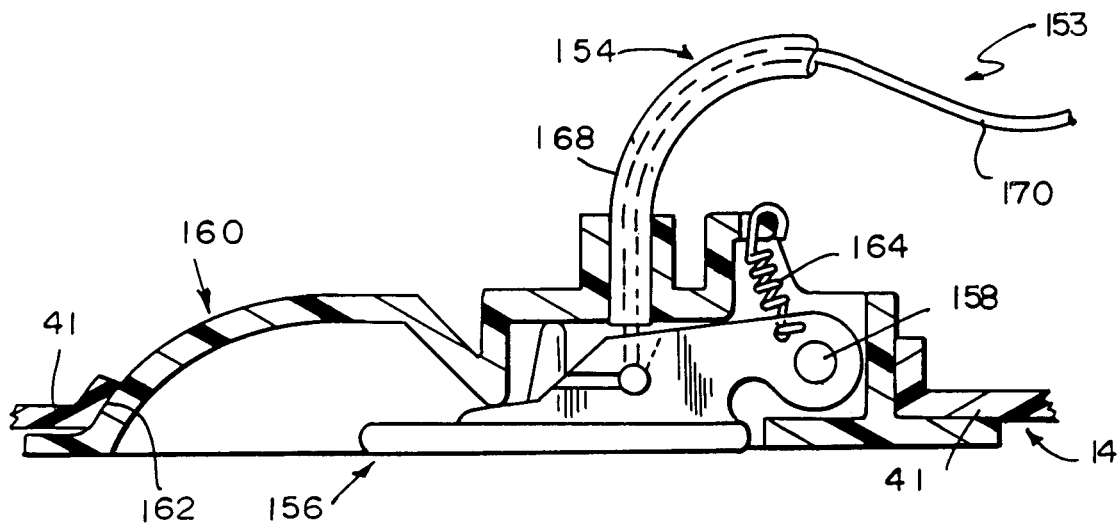
FIG. 15 is an enlarged sectional view taken along line 15-15 of FIG. 1 showing an actuator lever included in a hook-release controller associated with the seat-back lock and coupled to an armrest included in the juvenile seat.
Figure 16:
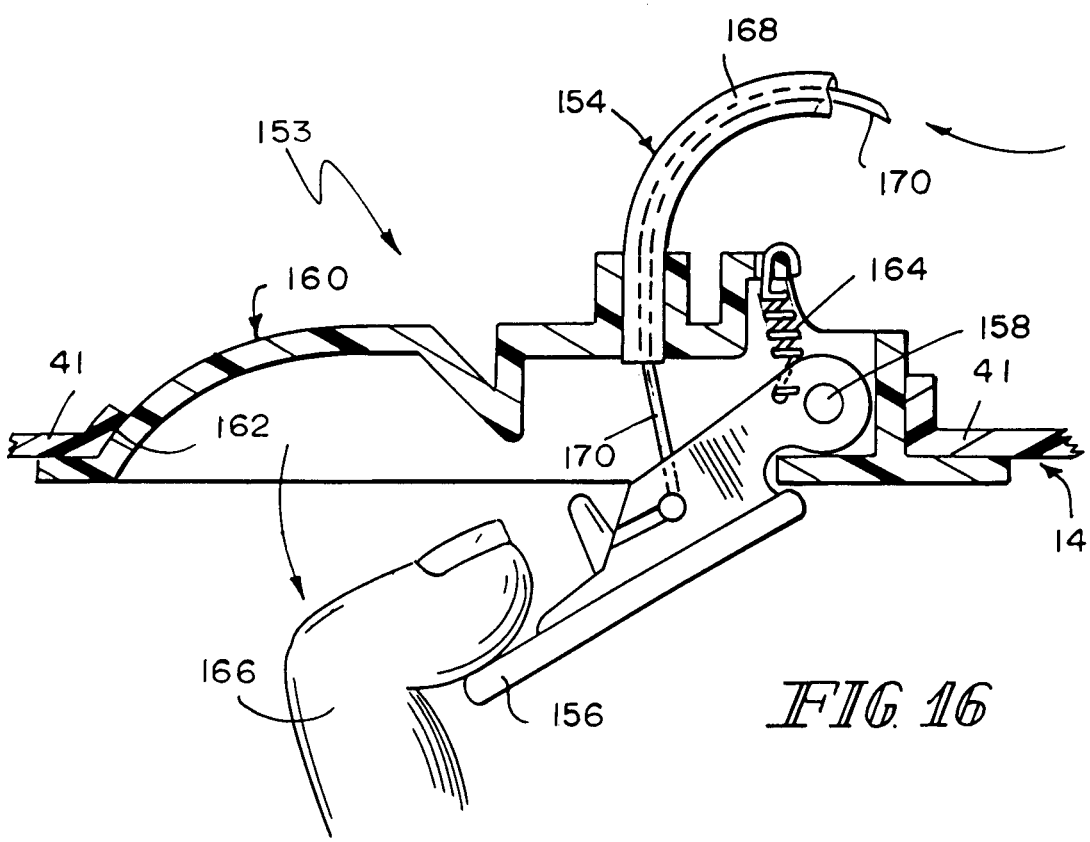
FIG. 16 is a sectional view similar to FIG. 15 showing pivoting motion of the actuator lever about a vertical pivot axis to activate a linkage interconnecting the actuator lever and the hook to cause the hook to move from the locked position shown, for example, in FIG. 12 to the unlocked position shown, for example, in FIG. 10.
Figure 23A:
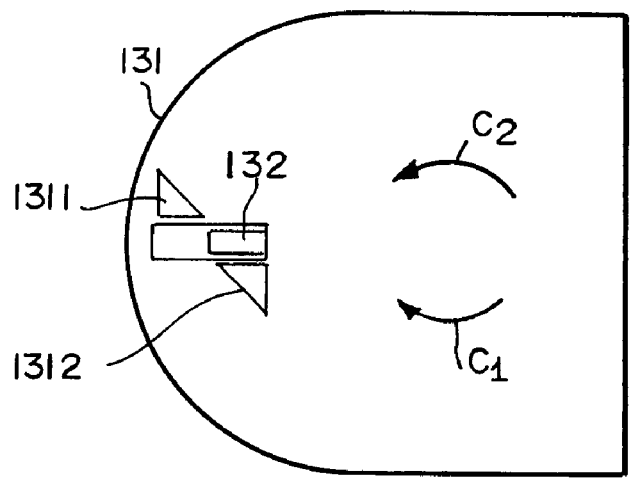
FIGS. 23a and 23b show a diagrammatic view of a portion of a direction-selector switch and two triangle-shaped anti-rotation stops in accordance with the present disclosure.
Figure 23B:
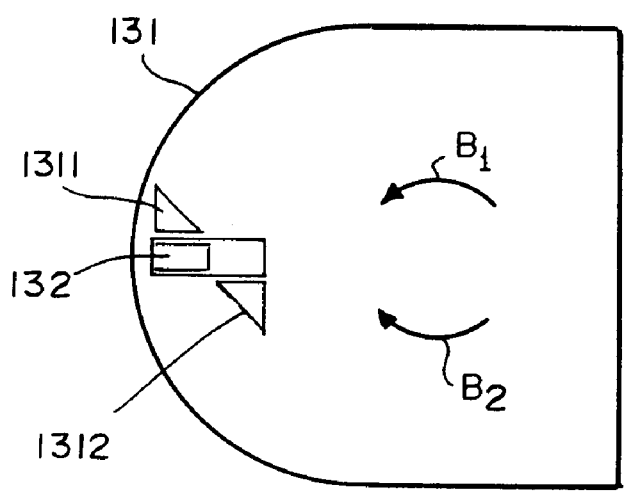

An illustrative hook-release controller 153 is coupled to first armrest 41 and is shown, for example, in FIGS. 15 and 16. Hook-release controller 153 includes an actuator lever 156 mounted for pivotable movement on a pivot post 158 coupled to a housing 160 mounted in an aperture 162 formed in armrest 41. Hook-release controller 153 also includes a return spring 164 coupled to housing 160 and actuator lever 156. Return spring 164 is configured to provide means for yieldably moving actuator lever 156 from an extended position shown away from housing 160 in FIG. 16 to a retracted position in housing 160 shown in FIG. 15 whenever a caregiver 166 releases actuator lever 156.

An illustrative linkage 154 includes a tube 168 coupled to housing 160 and a control wire 170 extending through a passageway formed in tube 168 as suggested in FIGS. 15 and 16. Control wire 170 is coupled at one end to actuator lever 156 as suggested in FIGS. 15 and 16 and at an opposite end to axle mount 89 of hook 80 as shown in FIGS. 10-12. Pivoting movement of actuator lever 156 about pivot post 158 in direction 172 as suggested in FIG. 16 pulls on control wire 170 to cause hook 80 to pivot from the locked position shown in FIG. 12 to the unlocked position shown in FIG. 10. Spring-loaded hook-retainer latches 81, 82 engage plate flanges 91, 92 on hook 80 to retain hook 80 in that unlocked position until hook-retainer latches 81, 82 later engage U-shaped anchor rail 73 of stationary seat anchor 20 during swiveling motion of juvenile seat 14 toward the forward-facing travel position shown in FIGS. 2, 7, and 12.

Illustrative embodiments of swivel 46 and swivel-direction controller 48 are shown in FIGS. 17-22. Swivel 46 is coupled to juvenile seat 14 to support juvenile seat 14 for swiveling motion about axis 18. Swivel 46 includes a seat mount 178 coupled to juvenile seat 14 (as suggested diagrammatically in FIG. 17) and a rotatable member (e.g. ring) 180 mounted in swivel-mount pad 28 of base 12 for rotation about axis 18 and coupled to seat mount 178 to support seat mount 178 for rotation about axis 18. A return spring 181 is coupled to spring mount 182 and to rotatable ring 180 and configured to provide automatic means for yieldably rotating ring 180 (when juvenile seat 14 is released) relative to base 12 about axis 18 to assume the forward-facing travel position of FIG. 2 as suggested in FIGS. 17, 19, and 21.

Swivel-direction controller 48 illustratively includes a first anti-rotation stop 184 coupled to the underside of rotatable ring 180 and a second anti-rotation stop 185 coupled to the underside of rotatable ring 180. Stops 184 and 185 are arranged to lie in spaced-apart relation to one another to define a block-receiving space 186 therebetween as suggested in FIGS. 17, 20, and 22. In an illustrative embodiment, each stop 184, 185 is triangle-shaped and includes a straight wall 187 defining a lateral boundary of block-receiving space 186.

Swivel-mount pad 28 of base 12 includes a foundation 179 underlying seat bottom 38 of juvenile seat 14 and a bottom plate 188 arranged to underlie rotatable ring 180 and coupled to foundation 179 as suggested in FIG. 17. Bottom plate 188 is formed to include a grip tab-receiving guide slot 189 as shown in FIGS. 17 and 18.

As suggested in FIG. 17, swivel-direction controller 48 further includes a direction-selector switch 190 including rotation-inhibitor block 194 and a block mover 196 coupled to rotation-inhibitor block 194. Block mover 196 comprises a T-shaped plate 191 and a grip tab 192 coupled to a bottom side 193 of plate 191. Rotation-inhibitor block 194 is coupled to a top side 195 of plate 191 and arranged to lie above grip tab 192. Direction-selector switch 190 is arranged to lie between rotatable ring 180 and bottom plate 188 to extend grip tab 192 into grip tab-receiving guide slot 189 as suggested in FIGS. 17 and 18.

Block mover 196 of direction-selector switch 190 is mounted for "back-and-forth" movement (under the control of a caregiver) relative to bottom plate 188 (only when child restraint 10 is inverted) to cause rotation-inhibitor block 194 to move relative to rotatable member (e.g. ring) 180 between a first position shown in FIGS. 18-20 and a second position shown in FIGS. 21 and 22. During such back-and-forth movement, rotation-inhibitor block 194 is constrained to cause block 194 to remain in block-receiving space 186. During such movement, rotation-inhibitor block 194 will engage wall 187 of first anti-rotation stop 184 to block rotation of rotatable ring 180 about axis 18 in second direction 202 and allow rotation of rotatable ring 180 only in first direction 201 as suggested in FIGS. 19 and 20. Also during such back-and-forth movement, rotation-inhibitor block 194 will engage wall 187 of second anti-rotation stop 185 to block rotation of rotatable ring 180 about axis 18 in first direction 201 and allow rotation of rotatable ring 180 only in second direction 202 as suggested in FIGS. 21 and 22.

Child restraint 10 includes a seat support 11, a juvenile seat 14, and a swivel-direction controller 48. Seat support 11 includes a base 12 adapted to set on a vehicle seat and a swivel 46 coupled to base 12. Juvenile seat 14 is mounted on swivel 46 for swiveling motion on an arc $A_1, A_2$ relative to base 12 about an axis of rotation 18 along a first portion $A_1$ of the arc between a left-facing entry position 200L and a forward-facing travel position 200F and along a second portion $A_2$ of the arc between forward-facing travel position 200F and a right-facing entry position 200R. Swivel-direction controller 48 is coupled to base 12 and configured to cooperate with base 12 to provide means for selectively allowing swiveling motion of juvenile seat 14 relative to base 12 along one of the first portion $A_1$ of the arc to permit movement of juvenile seat 14 back and forth between left-facing entry position 200L and forward-facing travel position 200F and the second portion $A_2$ of the arc to permit movement of juvenile seat 14 back and forth between forward-facing travel position 200F and right-facing entry position 200R so that swiveling motion of juvenile seat 14 is limited to only one of the first and second portions $A_1, A_2$ of the arc at a time.

Swivel-direction controller 48 includes a rotatable member 180 mounted for rotation in base 12 about axis of rotation 18, a seat mount 178, first and second anti-rotation stops 184, 185, and a direction-selector switch 190. Seat mount 178 is coupled to rotatable member 180 to rotate therewith about axis of rotation 18 and coupled to juvenile seat 14 to support juvenile seat 14 for swiveling motion about axis of rotation 18.

First anti-rotation stop 184 is located a first distance $D_1$ from axis of rotation 18 and second anti-rotation stop 185 is located a lesser second distance $D_2$ from axis of rotation 18 a suggested in FIG. 22. First anti-rotation stop 184 is coupled to rotatable member 180 and associated with the first portion $A_1$ of the arc. Second anti-rotation stop 185 is coupled to rotatable member 180 and associated with the second portion $A_2$ of the arc. Direction-selector switch 190 is mounted for movement relative to base 12 at the option of a caregiver to engage one of the first anti-rotation stop 184 to allow swiveling motion of juvenile seat 14 along the second portion $A_2$ of the arc and block swiveling motion of juvenile seat 14 along the first portion $A_1$ of the arc and the second anti-rotation stop 185 to allow swiveling motion of juvenile seat 14 along the first portion $A_1$ of the arc and block swiveling motion of juvenile seat 14 along the second portion $A_2$ of the arc.

Direction-selector switch 190 includes a block mover 196 mounted for movement relative to base 12 and a rotation-inhibitor block 194 coupled to block mover 196 for movement therewith. Rotation-inhibitor block 194 is constrained to move in a block-receiving space 186 provided between first and second anti-rotation stops 184, 185 between a first position shown in FIG. 19 and a second position shown in FIG. 21.

In the first position shown in FIG. 19, rotation-inhibitor block 194 is positioned to engage first anti-rotation stop 184 on rotatable member 180 upon arrival of juvenile seat 14 at forward-facing travel position 200F to positively stop juvenile seat 14 in the forward-facing travel position 200F and to block swiveling motion of juvenile seat 14 from left-facing entry position 200L toward right-facing entry position 200R. Thus, mating engagement of rotation-inhibitor block 194 and first anti-rotation stop 184 positively establishes the forward-facing travel position 200F of juvenile seat 14 during swiveling motion of juvenile seat 14.

In the second position shown in FIG. 21, rotation-inhibitor block 194 is positioned to engage second anti-rotation stop 185 on rotatable member 180 upon arrival of juvenile seat 14 at forward-facing travel position 200F to positively stop juvenile seat 14 in the forward-facing travel position 200F and to block swiveling motion of juvenile seat 14 along the second portion $A_2$ of the arc during swiveling motion of juvenile seat 14 on the arc from right-facing entry position 20OR toward left-racing entry position 200L. Thus, mating engagement of rotation-inhibitor block 194 and second anti-rotation stop 185 positively establishes the forward-facing travel position 200F of juvenile seat 14 during swiveling motion of juvenile seat 14.

Base 12 includes a bottom plate 188 adapted to set on a vehicle seat and formed to include an opening 189 exposing a grip tab 192 included in block mover 196. Grip tab 192 is configured to be gripped by a user and moved in opening 189 to cause rotation-inhibitor block 194 to move in block-receiving space 186 between the first and second positions only when base 12 and juvenile seat 14 are inverted.

Block mover 196 includes a plate 191 formed to include a bottom side 193 and a top side 195. Grip tab 92 is arranged to extend through opening 189 formed in base 12 during movement of rotation-inhibitor block 194 between the first and second positions. Rotation-inhibitor block 194 is coupled to top side 195 of plate 191 as suggested in FIG. 17.

Base 12 includes a bottom plate 188 and a foundation 179 coupled to bottom plate 88 and arranged to lie between juvenile seat 14 and bottom plate 188 as suggested in FIG. 17. Rotatable member 180 is positioned to lie in a space provided between foundation 179 and bottom plate 188. Rotatable member 180 is formed to include a bottom surface facing toward bottom plate 188 and carrying first and second anti-rotation stops 184, 185. Block mover 196 and the rotation-inhibitor block 194 are arranged to move relative to rotatable member 180 in a space provided between rotatable member 180 and bottom plate 188.

Child restraint 10 further includes spring means (shown diagrammatically in FIGS. 17, 20, and 22) for yieldably urging rotatable member 180 to rotate in a first direction 301 (see FIG. 20) to cause first anti-rotation stop 184 on rotatable member 180 to engage rotation-inhibitor block 194 of direction-selector switch 190 when rotation-inhibitor block 194 is moved to assume the first position shown in FIG. 19. Spring means also yieldably urges rotatable member 180 to rotate in an opposite second direction 302 (see FIG. 22) to cause second anti-rotation stop 185 on rotatable member 180 to engage rotation-inhibitor block 194 of direction-selector switch 190 when rotation-inhibitor block 194 is moved to assume the second position shown in FIG. 21 so that juvenile seat 14 is swiveled to assume forward-facing travel position 200F after juvenile seat 14 is moved by a caregiver relative to base 12 to assume one of the left-facing and right-facing entry positions 200L, 200R and then released.

In a variant of the different embodiments previously described, we anticipate a child restraint according to the invention and comprising indexing means, controlling the rotation of the seat and forming a stop, so as to guarantee the proper positioning of the seat in the utilization position when it is pivoted in that direction.

Another embodiment is shown in FIGS. 13a and 13b, in which the pivoting seat 131 has two stops 1311 and 1312 on its lower part. One mobile stop 132, affixed to the base (not shown), is intended to cooperate with stop 1311 or stop 1312 in the utilization position, in such a way as to guarantee that seat 131 is correctly positioned in the utilization position, and that the fixation system of the upper part of the backrest of seat 131 and the base lock correctly.

The mobile stop 132 may assume two positions depending on whether the child car seat is placed on the left or the right side of the passenger compartment of the vehicle.

When the seat is placed on the left side of the vehicle, the mobile stop 132 is placed in the position shown in FIG. 13a. Seat 131 can then be pivoted in the direction of arrow C1 until it arrives in the utilization position in which mobile stop 132 cooperates with stop 1312 so that seat 131 is correctly positioned in the utilization position and so that the fixation system locks correctly. Seat 131 may be brought to the installation position by pivoting it in the direction of arrow C2.

When the child car seat is placed on the right side of the vehicle, mobile stop 132 is placed in the position shown in FIG. 13b. Seat 131 can then be pivoted in the direction of arrow B1 until it arrives at the utilization position in which mobile stop 132 cooperates with stop 1311 so that the seat 131 is correctly positioned in the utilization position and the fixation system locks correctly. Seat 131 may be brought to the installation position by pivoting it in the direction for arrow B2.

The inclined face of stops 1311, 1312 automatically permit the bringing of mobile stop 132 to the correct position (FIG. 9a or 9b) is a user due to misuse does not position it correctly.

The invention claimed is:

1. A child restraint comprising
a seat support including a base adapted to set on a vehicle seat and a swivel coupled to the base,
a juvenile seat mounted on the swivel for swiveling motion on an arc relative to the base about an axis of rotation along a first portion of the arc between a left-facing entry position and a forward-facing travel position and along a second portion of the arc between the forward-facing travel position and a right-facing entry position, and
a swivel-direction controller coupled to the base and configured to cooperate with the base to selectively lock the juvenile seat against movement along a portion of an arc while providing means for selectively allowing swiveling motion of the juvenile seat relative to the base along one of the first portion of the arc while locked to permit movement of the juvenile seat back and forth between the left-facing entry position and the forward-facing travel position and the second portion of the arc while locked to permit movement of the juvenile seat back and forth between the forward-facing travel position and the right-facing entry position so that swiveling motion of the juvenile seat is limited to only one of the first and second portions of the arc at a time.

2. The child restraint of claim 1, wherein the swivel-direction controller includes a rotatable member mounted for rotation in the base about the axis of rotation, a seat mount coupled to the rotatable member to rotate therewith about the axis of rotation and coupled to the juvenile seat to support the juvenile seat for swiveling motion about the axis of rotation, a first anti-rotation stop coupled to the rotatable member and associated with the first portion of the arc, a second anti-rotation stop coupled to the rotatable member and associated with the second portion of the arc, and a direction-selector switch mounted for movement relative to the base at the option of a caregiver to engage one of the first anti-rotation stop to allow swiveling motion of the juvenile seat along the second portion of the arc and block swiveling motion of the juvenile seat along the first portion of the arc and the second anti-rotation stop to allow swiveling motion of the juvenile seat along the first portion of the arc and block swiveling motion of the juvenile seat along the second portion of the arc.

3. The child restraint of claim 2, wherein the direction-selector switch includes a block mover mounted for movement relative to the base and a rotation-inhibitor block coupled to the block mover for movement therewith and the rotation-inhibitor block is constrained to move in a block-receiving space provided between the first and second anti-rotation stops between a first position wherein the rotation-inhibitor block is positioned to engage the first anti-rotation stop on the rotatable member upon arrival of the juvenile seat at the forward-facing travel position to block swiveling motion of the juvenile seat along the first portion of the arc during swiveling motion of the juvenile seat on the arc from the left-facing entry position toward the right-facing entry position and a second position wherein the rotation-inhibitor block is positioned to engage the second anti-rotation stop on the rotatable wheel upon arrival of the juvenile seat at the forward-facing travel position to block swiveling motion of the juvenile seat along the second portion of the arc during swiveling motion of the juvenile seat on the arc from the right-facing entry position toward the left-facing entry position.

4. The child restraint of claim 3, wherein the first anti-rotation stop is located a first distance from the axis of rotation and the second anti-rotation stop is located a lesser second distance from the axis of rotation.

5. The child restraint of claim 3, wherein the base includes a bottom plate adapted to set on a vehicle seat and formed to include an opening exposing a grip tab included in the block mover and configured to be gripped by a user and moved in the opening to cause the rotation-inhibitor block to move in the block-receiving space between the first and second positions only when the base and the juvenile seat are inverted.

6. The child restraint of claim 3, wherein the block mover includes a plate formed to include a bottom side and a top side and a grip tab coupled to the bottom side and arranged to extend through an opening formed in the base during movement of the rotation-inhibitor block between the first and second positions and wherein the rotation-inhibitor block is coupled the top side of the plate.

7. The child restraint of claim 3, wherein the base includes a bottom plate and a foundation coupled to the bottom plate and arranged to lie between the juvenile seat and the bottom plate, the rotatable member is positioned to lie in a space provided between the foundation and the bottom plate and is formed to include a bottom surface facing toward the bottom plate and carrying the first and second anti-rotation stops, and the block mover and the rotation-inhibitor block are arranged to move relative to the rotatable member in a space provided between the rotatable member and the bottom plate.

8. The child restraint of claim 7, wherein the block mover includes a plate and a grip tab, the rotation-inhibitor block is coupled to a top side of the plate facing upwardly toward the foundation, the grip tab is coupled to a bottom side of the plate facing downwardly toward the bottom plate of the base, the bottom plate is formed to include a grip tab-receiving guide slot, and the grip tab is arranged to extend into the grip tab-receiving guide slot and remain therein during movement of the rotation-inhibitor block back and forth between the first and second positions.

9. The child restraint of claim 3, further comprising spring means for yieldably urging the rotatable member to rotate in a first direction to cause the first anti-rotation stop on the rotatable member to engage the rotation-inhibitor block of the direction-selector switch when the rotation-inhibitor block is moved to assume the first position and in an opposite second direction to cause the second anti-rotation stop on the rotatable member to engage the rotation-inhibitor block of the direction-selector switch when the rotation-inhibitor block is moved to assume the second position so that the juvenile seat is swiveled to assume the forward-facing travel position after the juvenile seat is moved by a caregiver relative to the base to assume one of the left-facing and right-facing entry positions and then released.

10. The child restraint of claim 2, wherein the seat support further includes a spring mount coupled to the base and a return spring coupled to the spring mount and to the rotatable member and configured to provide automatic means for yieldably rotating the rotatable member relative to the base about the axis of rotation to assume the forward-facing travel position.

11. The child restraint of claim 2, wherein the first anti-rotation stop is located a first distance from the axis of rotation and the second anti-rotation stop is located a lesser second distance from the axis of rotation.

12. A child restraint comprising
a seat support including a base adapted to set on a vehicle seat and a swivel coupled to the base,
a juvenile seat mounted on the swivel for swiveling motion relative to the base about an axis of rotation between a left-facing entry position and a forward-facing travel position and between the forward-facing travel position and a right-facing entry position, and
a swivel-direction controller includes a rotatable ring mounted to the base for rotation with the juvenile seat about the axis of rotation, first and second anti-rotation stops coupled to the rotatable ring and arranged to lie in spaced-apart relation to one another to define a block-receiving space therebetween, and a direction-selector switch including a rotation-inhibitor block mounted for movement in the block-receiving space between a first position wherein the rotation-inhibitor block engages the first anti-rotation stop on the rotatable ring to block swiveling motion of the juvenile seat between the forward-facing travel position and the left-facing entry position yet allow swiveling motion of the juvenile seat between the forward-facing travel position and the right-facing entry position and a second position wherein the rotation-inhibitor block engages the second anti-rotation stop on the rotatable ring to block swiveling motion of the juvenile seat between the forward-facing travel position and the right-facing entry position yet allow swiveling motion of the juvenile seat between the forward-facing travel position and the left-facing entry position.

13. The child restraint of claim 12, wherein the first anti-rotation stop is located a first distance from the axis of rotation and the second anti-rotation stop is located a lesser second distance from the axis of rotation.

14. The child restraint of claim 12, wherein the seat support further includes a spring mount coupled to the base and a return spring coupled to the spring mount and to the rotatable ring and configured to provide automatic means for yieldably rotating the rotatable ring relative to the base about the axis of rotation to assume the forward-facing travel position whenever a caregiver releases the juvenile seat for swiveling motion about the axis of rotation.

* * * * *